No. 770,348. PATENTED SEPT. 20, 1904.
C. BURNETT.
TIRE FOR VEHICLE WHEELS.
APPLICATION FILED AUG. 28, 1903.
NO MODEL.
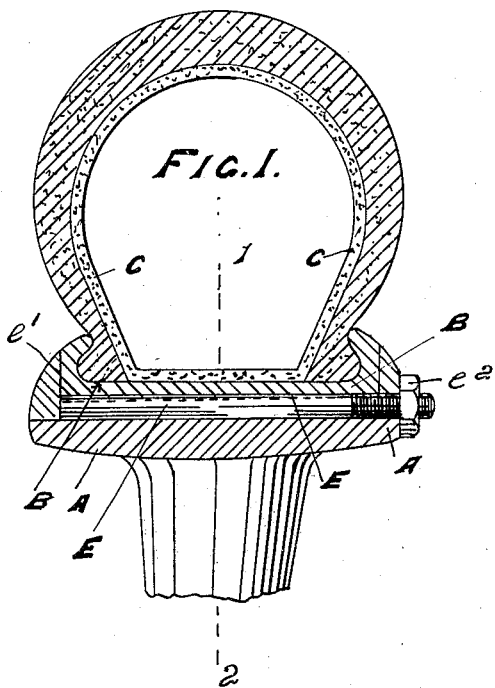
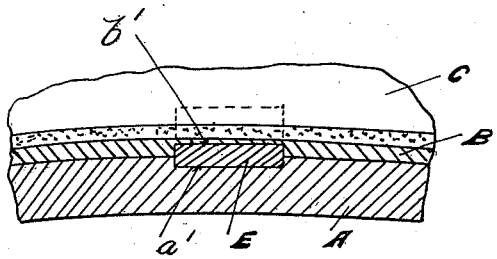
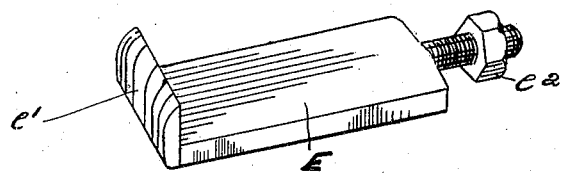
Witnesses
Inventor No. 770,348. Patented September 20, 1904.

UNITED STATES PATENT OFFICE.

CUTHBERT BURNETT, OF DURHAM, ENGLAND.

TIRE FOR VEHICLE-WHEELS.

SPECIFICATION forming part of Letters Patent No. 770,348, dated September 20, 1904.

Application filed August 28, 1903. Serial No. 171,158. (No model.)

*To all whom it may concern:*

Be it known that I, CUTHBERT BURNETT, engineer, a subject of the King of Great Britain, and a resident of Grange House, Durham, in the county of Durham, England, have invented a certain new and useful Improvement in or Relating to Tires for the Wheels of Motor-Cars and other Vehicles, (for which I have applied for a patent in Great Britain, Patent No. 23,123, dated October 23, 1902,) of which the following is a specification.

This invention relates to wheels of motor-cars and other vehicles, and has for its object to enable a punctured or damaged tire to be easily and quickly replaced by a new one already inflated, if desired, thus avoiding the delay necessitated by stopping to repair the damaged tire.

In order that this invention may be clearly understood and more easily carried into practice, I have appended hereunto three sheets of drawings upon which I have illustrated the nature of my said invention.

Figure 1 is a section of a rim and tire with intermediate ring, all secured together by bolts. Fig. 2 is a view of the bolts. Fig. 3 is a longitudinal section through Fig. 1 on the line 1 2.

In carrying this invention into effect the wheel is provided with the metallic ring or rim A, which permanently forms part of the wheel and which is formed to receive a separate interchangeable ring B, which carries the tire C and which can be bolted or otherwise suitably secured to the ring or rim A in such a manner as to be readily attached and detached.

The outer surface of the ring or rim A is preferably formed to a slight taper, the inner surface of the ring B being formed to a similar taper to fit same, while the outer ring B may be constructed to receive any form or make of pneumatic tire C.

In bolting or otherwise securing the ring B to the rim A various means may be employed—as, for instance, the ring B may be bolted in position by a series of bolts E, for the accommodation of which the recesses $a'$ and $b'$ are respectively made in the outer and inner faces of the rim A and ring B, while flanges $e'$ and screw-nuts $e^2$ are provided, so as to enable the ring B to be drawn tightly into position on the rim A. The bolts E are recessed into two parts A and B, so as to prevent any possibility of "creep" occurring between the two parts A and B; but such creep may be prevented by having the opposite faces of A and B provided with lateral corrugations which fit each other.

Having now described my invention, what I claim as new, and desire to secure by Letters Patent, is—

In a tire for wheels the combination of the wheel-rim having a transversely-disposed groove in its outer surface, a tire-holding ring encircling the wheel-rim having a transversely-disposed groove in its inner surface to register with the transversely-disposed groove of the wheel-rim, and a clamping member contained in the grooves having gripping members to engage the tire-holding ring and prevent its creeping upon the wheel-rim.

In witness whereof I have hereunto set my hand in the presence of two witnesses.

CUTHBERT BURNETT.

Witnesses:
 ARTHUR ERNEST THWAIKS,
 GEORGE HEATLEY.